United States Patent [19]

Lesartre et al.

[11] Patent Number: 5,796,997
[45] Date of Patent: Aug. 18, 1998

[54] FAST NULLIFY SYSTEM AND METHOD FOR TRANSFORMING A NULLIFY FUNCTION INTO A SELECT FUNCTION

[75] Inventors: Gregg Lesartre; Jonathan Lotz, both of Fort Collins, Colo.

[73] Assignee: Hewlett-Packard Company, Palo Alto, Calif.

[21] Appl. No.: 647,539

[22] Filed: May 15, 1996

[51] Int. Cl.$^6$ .................................................. G06F 9/38
[52] U.S. Cl. ............................................. 395/581; 395/394
[58] Field of Search .................................... 395/391, 392, 395/393, 394, 395, 580, 581, 800.23

[56] References Cited

U.S. PATENT DOCUMENTS

| | | | |
|---|---|---|---|
| 4,858,105 | 8/1989 | Kuriyama et al. | 395/582 |
| 5,051,896 | 9/1991 | Lee et al. | 395/567 |
| 5,150,470 | 9/1992 | Hicks et al. | 395/393 |
| 5,381,531 | 1/1995 | Hanawa et al. | 395/582 |
| 5,511,172 | 4/1996 | Kimura et al. | 395/582 |
| 5,522,084 | 5/1996 | Ando | 395/800 |

OTHER PUBLICATIONS

Mike Johnson, "Superscalar Microprocessor Design", Prentice-Hall 1991, pp. 9-15 and 129-130.

*Primary Examiner*—Krisna Lim
*Assistant Examiner*—Viet Vu

[57] ABSTRACT

A fast nullify system and method facilitate handling of nullification dependencies in a processor that executes instructions out of order. Instructions are forwarded from an instruction fetch mechanism to a reordering mechanism, where the instructions are permitted to execute out of order. After execution of an instruction by an execution unit, instructions are retired by a retire mechanism, which transforms the results of instruction execution to the architecture state. While instructions are executed in the reordering mechanism nullifying instructions and dependent instructions that can potentially be nullified by the nullifying instructions are identified. For each dependent instruction, a determination is made as to whether the dependent instruction qualifies for a fast nullify procedure in that the dependent instruction has less operands than a number that can be read by the execution unit. When a dependent instruction qualifies, then the qualified dependent instruction and its corresponding nullifying instruction are permitted to execute substantially concurrently. During execution of the dependent instruction, the execution unit reads a previous result of a target register associated with the dependent instruction. The current result of the dependent instruction is stored in the target register when the dependent instruction is not nullified by the nullifying instruction. In contrast, the previous result is maintained in the target register when the dependent instruction is nullified by the nullifying instruction.

12 Claims, 6 Drawing Sheets

FAST NULLIFY SYSTEM AND METHOD FOR TRANSFORMING A NULLIFY FUNCTION INTO A SELECT FUNCTION

FIELD OF THE INVENTION

The present invention generally relates to computer processors that execute instructions out of order, and more particularly, to a fast nullify system and method for enhancing the performance of a nullification tracking system that tracks nullification dependencies in a processor that executes instructions out of order. The fast nullify system and method is particularly suited to increase the speed of integer and floating point operations that are specified by arithmetic instructions that are potentially nullified.

BACKGROUND OF THE INVENTION

A computer processor (processing unit) generally comprises a control unit, which directs the operation of the system, and one or more arithmetic execution units, which perform computational operations. The execution units can include an arithmetic logic unit (ALU) for integer operations and a multiple accumulate unit (MAC) for floating point operations. The overall design of a processor involves the selection of a register set(s), communication passages between these registers, and a means of directing and controlling how these operate. Normally, a processor is directed by a program, which includes a series of instructions that are kept in a main memory. Each instruction is a group of bits, usually one or more words in length, specifying an operation to be carried out by the processor. In general, the basic cycle of a processor comprises the following steps: (a) fetch an instruction from memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as super-scalar processors where two or more scalar operations are performed in parallel, the processor may be designed to perform instructions that are out of order, or in an order that is not consistent with that defined by the software driving the processor. In these systems, instructions are executed when they can be executed, as opposed to when they appear in the sequence defined by the program. Moreover, after execution of out of order instructions, the results are ultimately reordered to correspond with the instruction order, prior to passing the results back to the program.

Out of order execution of instructions poses peculiar obstacles from a design perspective. One such obstacle involves accommodation of instruction nullification. Instruction nullification involves the concept of a particular instruction nullifying, or rendering inoperative or invalidating, another instruction based upon the result of execution of the particular instruction. As prescribed by the Precision Architecture (PA) industry standard, an instruction is nullified, if at all, by an immediately preceding instruction in the program order.

As an example, consider a branch instruction. When a branch instruction is executed, then the code either jumps to a new location or continues executing instructions just after the branch instruction, depending upon the outcome of the branch instruction. Furthermore, in systems that comply with the PA standard, a delay slot instruction that immediately follows the branch instruction is always executed, notwithstanding the outcome of the branch instruction, unless it is nullified by the branch instruction. In other words, even if the outcome of the branch instruction requires the code to jump to the new location in the program, the delay slot instruction will be executed prior to the instruction at the new location, unless the delay slot instruction is nullified by the branch instruction.

When instructions are performed out of order, the nullification dependencies can undesirably slow operation by requiring that those instructions (hereinafter, "dependent instructions") that might be nullified to wait for those instructions (hereinafter, "nullify instructions") that have the potential to nullify. Accordingly, a heretofore unaddressed need exists in the industry for an instruction nullification system and method for tracking nullification dependencies in a high performance manner in a processor that executes instructions out of order.

SUMMARY OF THE INVENTION

An object of the present invention is to overcome the deficiencies and inadequacies of the prior art, as discussed previously in the background section.

Briefly described, the present invention provides for a fast nullify system and method that is implemented in a processor that executes instructions out of order. The fast nullify system and method enhances the performance of a nullification system that tracks nullification dependencies among arithmetic instructions. The arithmetic instructions are executed by an execution unit, such as an arithmetic logic unit (ALU) for integer operations or a multiple accumulate unit (MAC) for floating point operations, and the fast nullify system and method can be employed in connection with integer operations as well as floating point operations. In essence, the fast nullify system and method allows the processor to avoid a dependency that would normally slow operation.

The fast nullify system is implemented as follows. Instructions are forwarded from an instruction fetch mechanism to a reordering mechanism, where the instructions are permitted to execute out of order. After execution of an instruction by an execution unit, instructions are retired by a retire mechanism, which transforms the results of instruction execution to the architecture state.

While instructions are executed in the reordering mechanism, nullifying instructions and dependent instructions that can potentially be nullified by the nullifying instructions are identified. For each dependent instruction, a determination is made as to whether the dependent instruction qualifies for a fast nullify procedure in that the dependent instruction has less operands than a number that can be read by the execution unit.

When a dependent instruction qualifies, then the qualified dependent instruction is permitted to launch execution just after its corresponding nullifying instruction launches execution so that the foregoing instructions are permitted to execute substantially concurrently. During execution of the dependent instruction, the execution unit reads a previous result of a target register associated with the dependent instruction. The current result of the dependent instruction is stored in the target register when the dependent instruction is not nullified by the nullifying instruction. In contrast, the previous result is maintained in the target register when the dependent instruction is nullified by the nullifying instruction. Thus, a potentially nullified instruction is transformed into a select operation in order to make its result available earlier in this out of order implementation.

The invention can also be viewed as a method for implementing a fast nullify procedure for facilitating handling of nullification dependencies in a processor that executes instructions out of order. The method can be broadly conceptualized as comprising the following steps: identifying a nullifying instruction and a dependent instruction that can potentially be nullified by the nullifying instruction; determining that the dependent instruction qualifies for the fast nullify procedure in that the dependent instruction has less operands than a number that can be read by an execution unit; allowing the dependent instruction and the nullifying instruction to execute concurrently; during execution of the dependent instruction, reading with the execution unit a previous result of a target register associated with the dependent instruction using the otherwise unused port; storing a current result of the dependent instruction in the target register when the dependent instruction is not nullified by the nullifying instruction; and maintaining the previous result in the target register when the dependent instruction is nullified by the nullifying instruction.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENT

Figure 1:
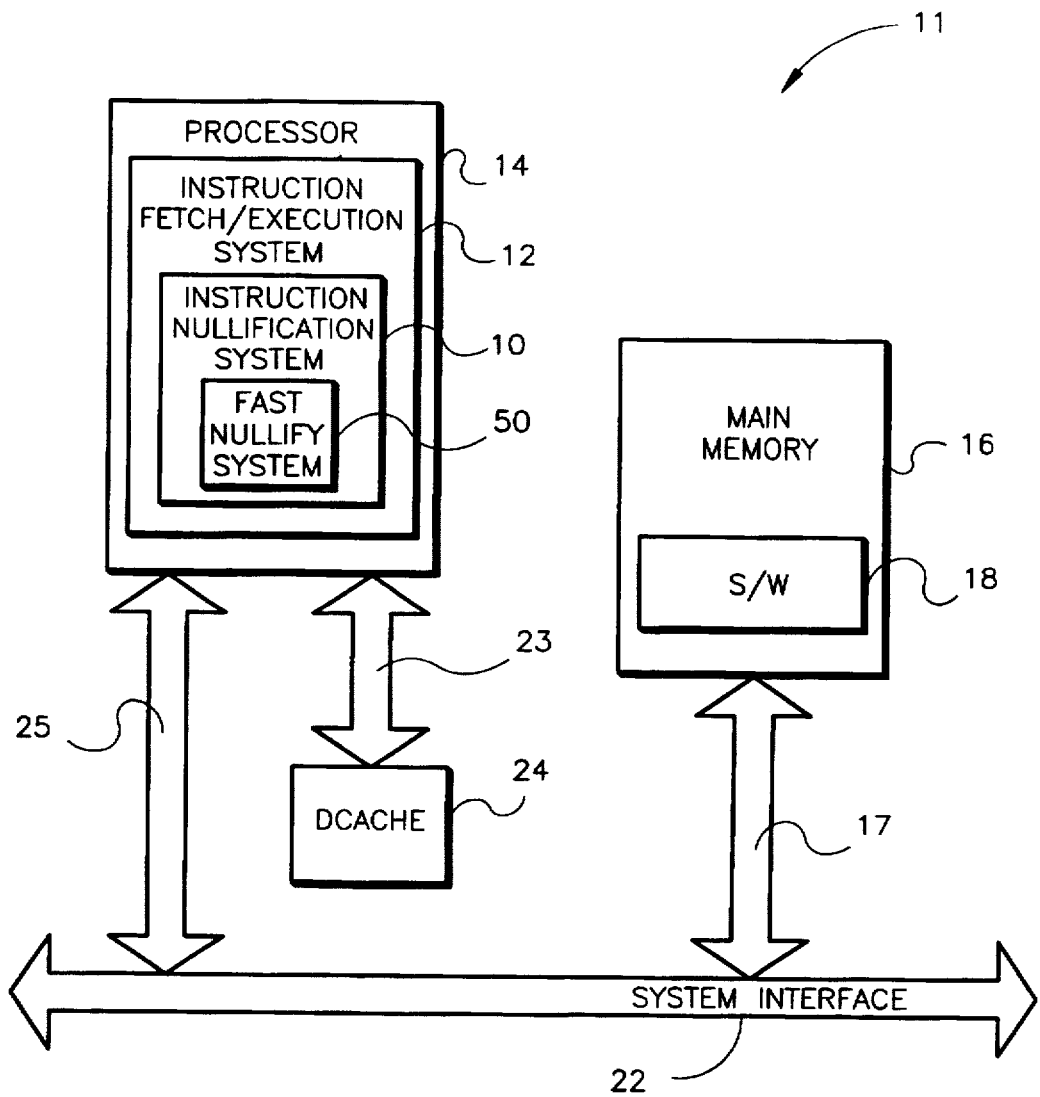
FIG. 1 is a electronic block diagram of a computer that can implement the fast nullify system and method of the invention.

As shown in FIG. 1, the fast nullify system 50 and associated methodology of the present invention is implemented within a computer 11, and particularly, within an instruction nullification system 10 of an instruction fetch/execution system 12 within a processor 14 of the computer 11. The computer 11 generally comprises the processor 14 that executes instructions out of order, a main memory 16, such as a random access memory, having software (S/W) 18 for driving the processor 14, a data cache 24 (dcache) interconnected with the processor 14 as indicated by reference arrow 23, and a system interface 22, such as one or more buses, interconnecting the processor 14 and the main memory. As the instruction fetch/execution system 12 in the processor 14 executes the software 18, data that is in current use in the processor 14 is moved into the dcache 24, thereby reducing the average access time for the processor's memory requests and minimizing traffic on the system interface 22. It should be mentioned that, with the exception of the instruction nullification system 10, the fast nullify system 50, and their associated methodology, all of the aforementioned computer components and their functionality are well known and understood in the art.

Figure 2:
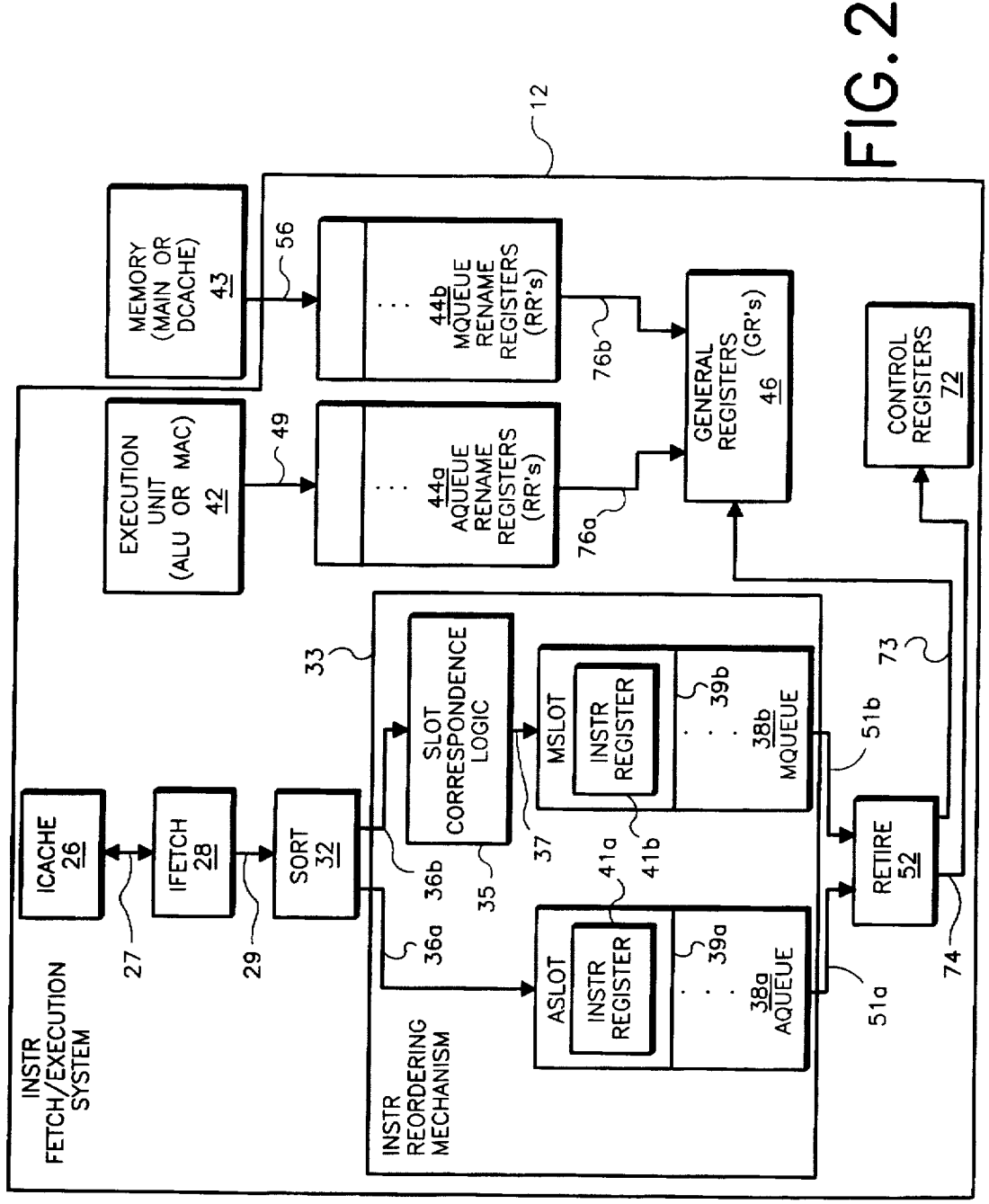
FIG. 2 is a electronic block diagram of the instruction fetch/execution system of FIG. 1 that implements the novel fast nullify system and method.

A possible implementation of the instruction fetch/execution system 12 is illustrated by way of electronic block diagram in FIG. 2. As shown in FIG. 2, the instruction fetch/execution system 12 has an instruction cache (icache) 26 for storing instructions from the software 18 (FIG. 1). An instruction fetch mechanism (ifetch) 28 communicates with the instruction cache 26 and retrieves instructions from the cache 26 for ultimate execution. In the preferred embodiment, the ifetch mechanism 28 fetches four instructions, each being 32 bits, at a time and transfers the instructions to a sort mechanism 32.

From the sort mechanism 32, the instructions are sent to a suitable reordering mechanism, such as a queue(s) or reservation station. In the preferred embodiment, the instructions are sorted and distributed, or "inserted," into an arithmetic logic unit (ALU) queue (aqueue) and a memory queue (mqueue), depending upon the operation to be accomplished by each instruction. More specifically, the sort mechanism 32 receives the instructions from the ifetch mechanism 28 and determines whether each instruction is directed to an operation involving either (a) an arithmetic execution unit 42 (i.e., either an arithmetic logic unit (ALU) for integer operations or a multiple accumulate unit (MAC) for floating point operations) or (b) the memory 43 (i.e., the dcache 24 or the main memory 16). The sort mechanism 32 distributes arithmetic and memory instructions along respective paths 36a and 36b that are ultimately destined for the aqueue 38a and the mqueue 38b, respectively.

Furthermore, in specific regard to the instruction nullification system of the present invention, the sort mechanism 32 determines instruction nullification dependencies. In other words, the sort mechanism 32 determines which instructions (nullifying instructions) can potentially nullify another and which instructions (dependent instructions) can be potentially nullified.

The sort mechanism 32 associates and either asserts or deasserts a potentially nullified bit N in each instruction to indicate whether or not a particular instruction can nullify the next instruction. In general, nullifying instructions are arithmetic instructions, not memory instructions, and dependent instructions are either arithmetic instructions or memory instructions.

The sort mechanism 32 associates and either asserts or deasserts a potentially nullified bit Pn in each instruction to indicate whether or not a particular instruction is potentially nullified by a previous instruction.

The sort mechanism 32 is advised of a prediction as to whether or not each instruction will be nullified. In the preferred embodiment, branch prediction logic is implemented in the ifetch mechanism 28 to make such predictions, and this information is forwarded to the sort mechanism 32 by the ifetch mechanism 28. Based upon the prediction, the sort mechanism 32 associates and either asserts or deasserts a predicted potentially nullified bit PPn in each instruction to indicate whether or not a particular instruction is predicted to be potentially nullified by a previous instruction. In determining the state of the PPn bit, the sort mechanism 32 takes into account the existence and nonexistence of branches in the program. In essence, the use of the PPn bit allows the code to execute more quickly because code can begin to execute without having to wait on the outcome of a nullifying instruction, that as, a branch instruction. Further, when there is a misprediction, then any instructions involved in the misprediction are eventually either (a) purged or (b) are invalidated and then re-executed. Recovery from misprediction will be further described later in this document.

The aqueue 38a contains a plurality (28 in the preferred embodiment) of aslots 39a that have registers 41a for storing respective instructions that are directed to provoking operations at one or more (2 in the preferred embodiment) arithmetic logic units 42. The arithmetic instructions in the aqueue 38a are executed in any order possible (preferably, in data flow fashion). When execution of an instruction is commenced in either the aqueue 38a or the mqueue 38b, then the instruction is said to have "launched." The execution unit 42 retrieves one or more operands from rename registers (RRs) 44a, 44b and general registers (GRs) 46, pursuant to each instruction, and operates upon the operands. As an instruction completes operation upon operands, the results are captured by the aqueue RRs 44a, as indicated by reference arrow 49 and the instruction is marked as complete in the particular aslot 39a of the aqueue 38a. In the preferred embodiment, the aqueue 38a receives up to four instructions (32 bits each) per cycle from the sort mechanism 32 and transfers up to two instructions (preferably, 32 bits each) per cycle to a retire mechanism 52, as indicated by reference arrow 51a.

Out of order execution of instructions in the aqueue 38a should be performed under certain conditions to insure proper code execution and nullification prediction. In this regard, an arithmetic instruction that can act as a nullifying instruction should be executed before the dependent instruction that is potentially nullified. When the nullifying instruction launches, it releases the dependency and permits the dependent instruction to launch. Further, a subsequent instruction that depends on the dependent instruction cannot launch until it knows where to obtain its operand data, and therefore, a nullified or potentially nullified instruction does not launch until it can tell a subsequent dependent instruction where to get its operand data.

Further note that when an instruction is nullified, it is still executed and results are obtained. However, when it is retired, the nullified instruction and the results are disregarded.

With respect to instructions that are directed to the mqueue 38b, the instructions are passed through a slot correspondence logic 35, which can be any suitable logic or state machine, for ensuring that the program order of the instructions can be tracked, notwithstanding the separate queues 38a, 38b. The instructions are placed in respective slots (aslot, mslot) 39a, 39b within the aqueue 38a and mqueue 38b, and the slot correspondence logic 35 ensures that successive instructions can be tracked for prediction and nullification purposes. Upon insertion of an instruction into the mqueue 38b, the memory instruction is advised as to which arithmetic instruction can potentially nullify it by the slot correspondence logic 35 (FIG. 2). In the preferred embodiment, the slot correspondence logic 35 essentially provides the slot number (a pointer) of the arithmetic nullifying instruction to the appropriate mslot 39b that contains the potentially nullified instruction.

The mqueue 38b contains a plurality (28 in the preferred embodiment) of mslots 39b. Each mslot 39b includes a register 41b for storing a respective memory instruction. Memory instructions in the mqueue 38b can be classified as "loads" and "stores" to memory. A "load" is a request to transfer data from memory 43 (the dcache 24 or the main memory 16) to a register, whereas a "store" is a request to transfer data from a register to memory 43.

During execution of a memory instruction, a first phase involves executing a prescribed mathematical operation on operands with an address calculator (not shown for simplicity) in order to compute an address, and a second phase involves accessing the memory 43 (the main memory 16 or the dcache 24) for data based upon the calculated address. The mqueue 38b executes each of the instructions in any order possible (preferably, in data flow fashion) by performing each of the aforementioned two phases. As the memory instructions complete, the results are captured by the mqueue RRs 44b, as indicated by reference arrow 56, and the completed instruction is marked as complete in the mqueue 38b. In the preferred embodiment, the mqueue 38b receives up to four instructions (32 bits each) per cycle from the sort mechanism 32 and transfers up to two instructions (32 bits each) per cycle to the retire mechanism 52, as indicated by reference arrow 51b. For information concerning a preferred method for execution of memory instructions by the mqueue 38b, see copending application entitled "Store-To-Load Hazard Recovery System And Method For A Processor That Executes Instructions Out Of Order," filed on Mar. 1, 1996, and assigned Ser. No. 08/609,581, the disclosure of which is incorporated herein by reference. For more information concerning a preferred method for performing memory accesses pursuant to instruction execution, see copending application entitled "Address Aggregation System And Method For Increasing Throughput Of Addresses To A Data Cache Of A Processor," filed on Mar. 1, 1996, and assigned Ser. No. 08/609821, the disclosure of which is incorporated herein by reference.

The retire mechanism 52 receives executed instructions (preferably, two 32-bit words per cycle) from each of the queues 38a, 38b. The retire mechanism 52 commits the instruction results to the architecture state. When the retire mechanism 52 commits an instruction's results to the architecture state or when the retire mechanism 52 ignores the results of an instruction that has been nullified in one of the queues 38a, 38b, then the retire mechanism 52 is said to have "retired" the instruction. The software 18 (FIG. 1) is not made aware of any results that are not transformed to the architecture state by the retire mechanism 52. The retire mechanism 52 retires the instructions in the queues 38a, 38b in the program order defined by the software 18 by moving the instruction results to a GR 46 and/or a control register 72, as indicated by respective reference arrows 73, 74, depending upon the instruction's attributes, and causes the results of the instructions to be passed from the RRs 44a, 44b to the GRs 46, as indicated by the reference arrows 76a, 76b.

The retire mechanism 52 also has logic for determining whether there is an exception associated with an instruction. An exception is a flag that indicates a special circumstance corresponding with one or more previous instructions. In the event of an exception, the retire mechanism 52 discards all instructions within the queues 38a, 38b that precede the instruction that indicated the exception and causes the instruction fetch mechanism 28 to retrieve once again the instructions at issue for re-execution or to retrieved special software to handle the special circumstance. For information concerning exceptions and a preferred method for processing of exceptions by the retire mechanism 52, see copending application entitled "Panic Trap System And Method," filed on Mar. 1, 1996, and assigned Ser. No. 08/609,807, the disclosure of which is incorporated herein by reference.

Figure 3:
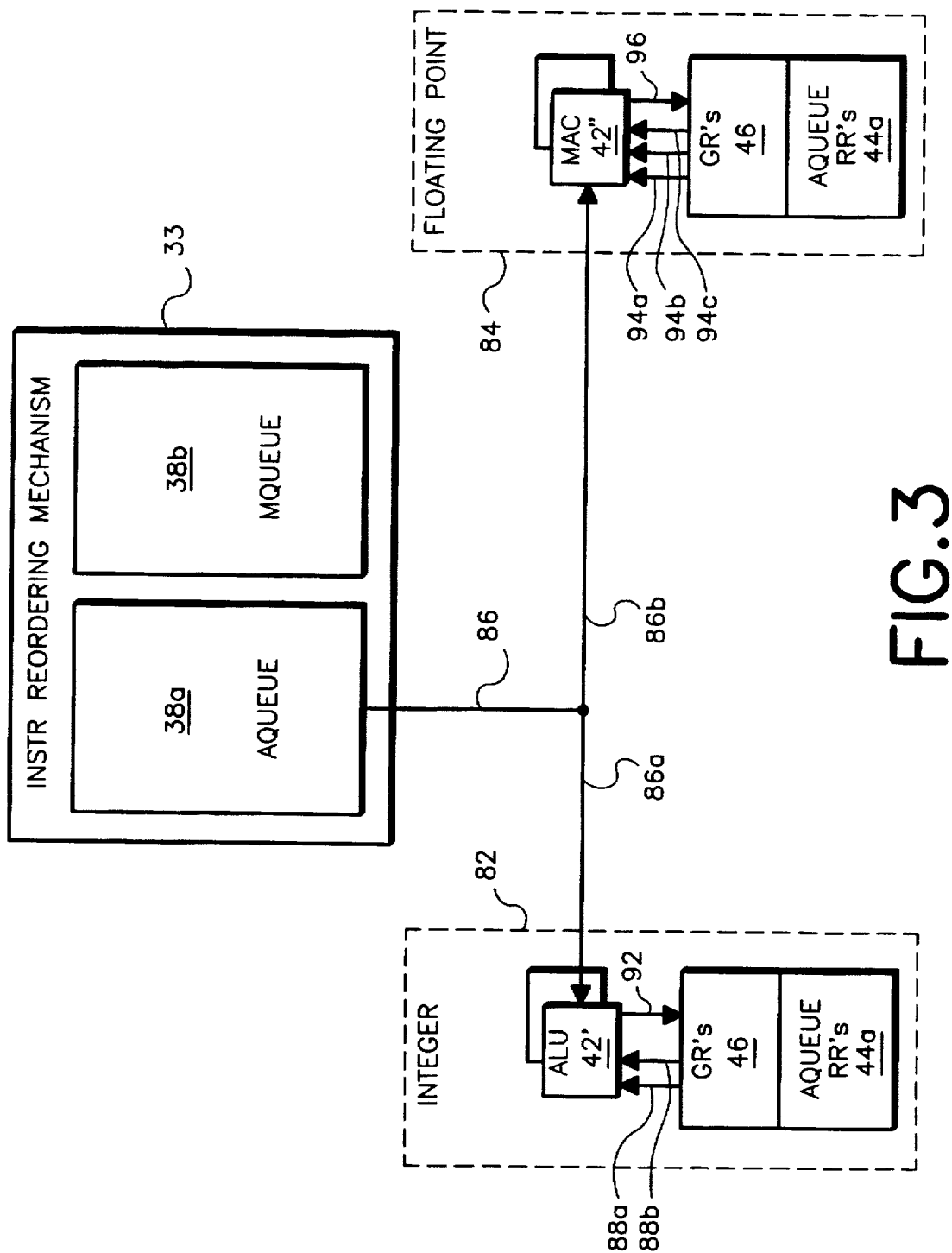
FIG. 3 is a electronic block diagram of integer and floating point data paths corresponding with the instruction fetch/execution system of FIG. 2.

With regard to arithmetic instruction execution, the integer and floating point data paths 82, 84 of the instruction fetch/execution system 12 of FIG. 2 are illustrated in FIG. 3. As shown in FIG. 3, arithmetic instructions from the aqueue 38a are broadcast to the integer data path 82 and the floating point data path 84, as indicated by reference arrows 86a, 86b, respectively. One of the data paths 82, 84 operates upon the arithmetic instruction, depending upon whether the instruction involves an integer operation or a floating point operation.

In the preferred embodiment, more than one, preferably two, instructions are forwarded to both the integer data path 82 and the floating point data path 84 during each cycle. Accordingly, two ALUs 42' are present in the integer data path 82 and two MACs 42" are present in the floating point data path 83 for concurrently executing respective instructions.

In the case of an arithmetic instruction dealing with an integer operation, the instruction is executed by an ALU 42'. When each ALU 42' processes its respective instruction, the ALU 42' reads up to two operands from the GRs 46 and/or the aqueue RRs 44a, as indicated by reference arrows 88a, 88b. The ALU 42' then operates upon the operands to generate a result that is written to, or forwarded to, the aqueue RRs 44a, as indicated by reference arrow 92.

In the case of a floating point arithmetic instruction, the instruction is forwarded to the MAC 42". When each MAC 42" processes an instruction, the MAC 42" reads up to three operands from the GRs 46 and/or the aqueue RRs 44a, as indicated by reference arrows 94a, 94b, 94c. The MAC 42" then operates upon the operands and generates a result that is written to, or forwarded to, the aqueue RRs 44a, as indicated by reference arrow 96.

In accordance with a fast nullify system 50 of the invention, with regard to integer operations involving one or no operands, the ALUs 42' are designed to read the operand, if any, and the previous result from the result register within the GRs 46 or the RRs 44a. The ALU 42' then selects as its results either the previous value of the result register or the current operation's result based upon whether the instruction gets nullified or not. As an example, consider the scenario where an operand is added to a constant by an instruction. In this example, the previous result and the operand of the operation are read from the GRs 46 and/or RRs 44a during the read operation. Then, the ALU 42' selects either the previous result or the new result (new result=operand+ constant), depending upon whether the instruction is nullified. As another example, consider the scenario where an instruction involves a copy operation. In this case, the ALU 42' selects either the previous result or the copied value, depending upon whether the instruction is nullified. Thus, a nullification instruction is transformed into a select operation in order to make its result available earlier in this out of order implementation.

It should be noted that, although not implemented in the preferred embodiment of the invention, the fast nullify system 50 and associated methodology may be employed in connection with floating point operations involving one or no operands. In this embodiment, the MACs 42" are designed to read the floating point operand, if any, and the previous result from the result register within the GRs 46 or the RRs 44a. The appropriate MAC 42" then selects as its results either the previous floating point value of the result register or the current operation's floating point result based upon whether the instruction gets nullified or not.

Figure 4:
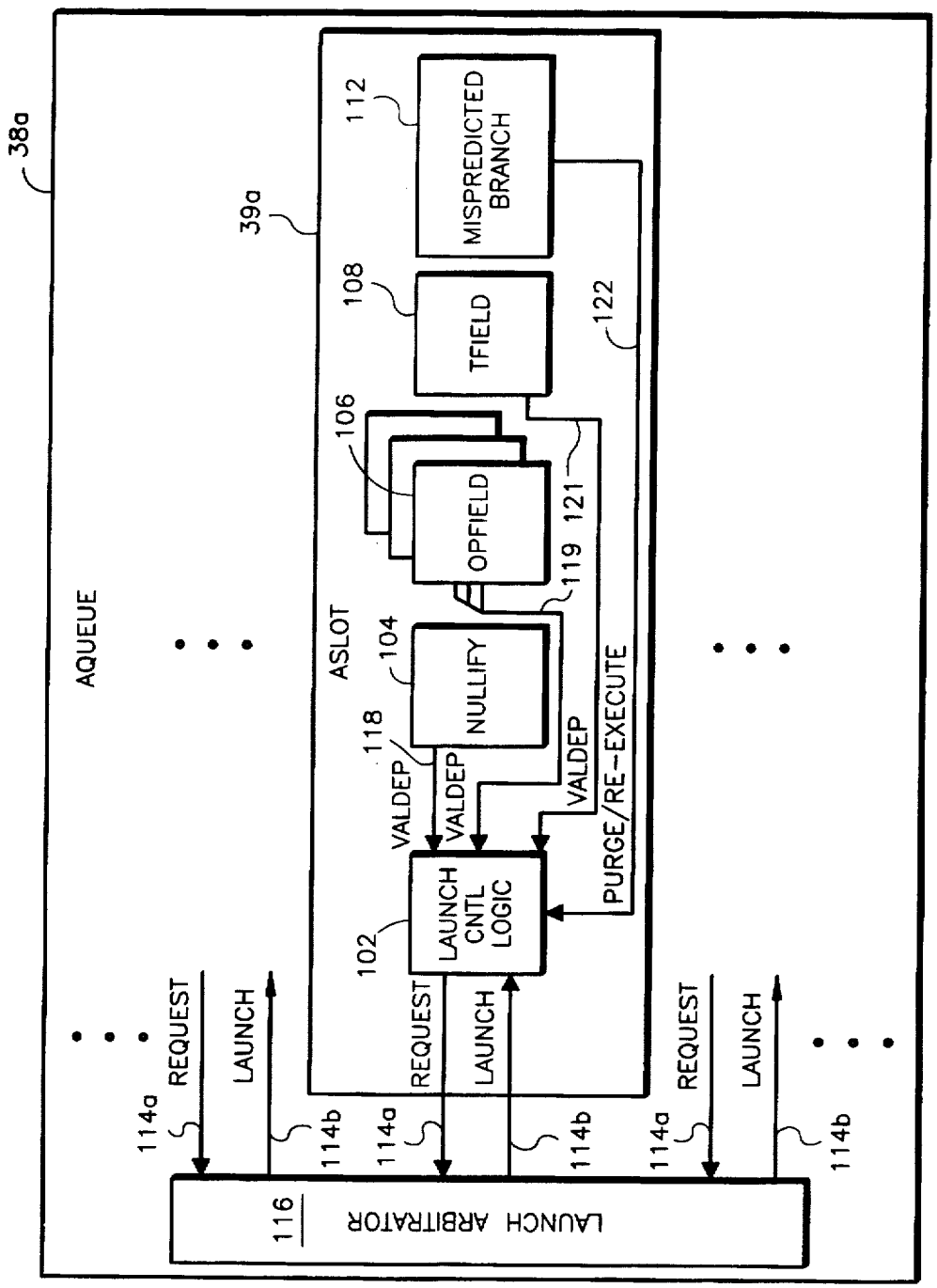
FIG. 4 is a electronic block diagram of the arithmetic logic unit (ALU) instruction queue (aqueue) of FIG. 2.

As shown in FIG. 4, each one of the aslots 39a in the aqueue 38a comprises launch control logic 102, a nullify mechanism 104, a plurality (preferably, three in number) of operand field (opfield) mechanisms 106, a target field (tfield) mechanism 108, and a mispredicted branch mechanism 112. Each of these components are described in detail hereafter.

The launch control logic 102 controls whether and when an instruction in the aslot 39a will launch, or will be passed to an execution unit 42 (FIGS. 2; ALU 42' or MAC 42" in FIG. 3). The launch control logic 102 generates a request signal 114a that is passed to a launch arbitrator 116. Generally, the launch arbitrator 116 receives, prioritizes, and grants requests 114a from the various aslots 39a. The launch arbitrator 116 can be implemented with any suitable logic or state machine. In the preferred embodiment, requests are prioritized based upon longevity in the aqueue 38a; however, other priority schemes are possible and may be utilized. When a particular aslot 39a is to be granted the ability to launch, the launch arbitrator 116 passes a launch signal 114b to the launch control logic 102 of the particular aslot 39a.

The launch control logic 102 receives valid dependency (valdep) signals 118, 119, 121 from the mechanisms 104, 106, 108, respectively. The valdep signals 118, 119, 121 indicate whether or not the local instruction associated with the aslot 39a is dependent upon an earlier instruction in the aqueue 38a or mqueue 38b, i.e., whether or not an earlier instruction is predicted to nullify the local instruction. Any one of the valdep signals 118, 119, 121 can cause the local instruction to be stalled, or can cause the launch to be held off.

The launch control logic 102 receives a purge/execute signal 122 from the mispredicted branch mechanism 112 to indicate whether or not the local instruction should be either purged or invalidated and re-executed. The purge/execute signal 122 is utilized to recover from a mispredicted branch and/or a mispredicted nullification.

The nullify mechanism 104 specifies whether or not the local instruction in the aslot 39a is nullified or potentially nullified. When an instruction in the aslot 39a is nullified, then it will discard its results. When an instruction is predicted as potentially nullified, then it has been speculated that the local instruction may be nullified and, therefore, the potentially nullified instruction must track its nullification dependencies. When an instruction is not predicted as potentially nullified, then it can ignore its nullify dependency, unless the mispredicted branch mechanism 112 determines a misprediction and notifies the launch control logic 102 of the misprediction. The nullify mechanism 104 is notified as to whether the local instruction is actually nullified after an earlier remote instruction launches and the result of remote instruction execution is returned. Furthermore, the sort mechanism 32 determines when an instruction is either potentially nullified or predicted potentially nullified and sets the bit Pn and bit PPn in the aslot 39a of the local instruction to inform the nullify mechanism 104 of this fact.

The opfield mechanisms 106 receive respective operand fields from the instructions. Operand data for an instruction of an aslot 39a is read from the GRs 46 and/or the RRs 44a and routed to the execution unit 42 (ALU 42' or MAC 42") when the instruction launches execution. If an instruction providing operand data to a local instruction has been nullified, then the local instruction can find its data in the GRs 46. If the previous instruction has not been nullified, then the local instruction can find its data in the aqueue RRs 44a associated with the previous instruction. In the fast nullify case, the data comes from the aqueue RRs 44a (FIGS. 2 and 3) associated with the previous instruction.

In the case of an integer operation, the opfield mechanisms 106 receive two operand fields respectively and in the case of a floating point operation, the opfield mechanisms 106 receive three operand fields respectively. Each opfield mechanism 106 is responsible for detecting when a local instruction is dependent upon an operand to be produced by a remote instruction at the time when the local instruction is inserted into a local aslot 39a. When the opfield mechanism 106 detects a dependency, then it marks the local instruction as a dependent instruction and establishes a pointer to an aqueue RR 44a that should contain the desired operand.

The tfield mechanism 108 essentially tracks the results of instruction execution and, particularly, the identification of the most recent aslot 39a or mslot 39b to have written a result to the local instruction's target register that is situated in the GRs 46. If the local instruction is nullified, then the local instruction had a dependency on a previous instruction that wrote the local instruction's target register, and any instruction dependent on the local instruction will get its data from the target register. Moreover, if the local instruction is not nullified, then an instruction that is dependent on the local instruction will get its data from the target rename register in the aqueue RRs 44a (FIG. 2) pertaining to the local instruction. Accordingly, if the local instruction is potentially nullified or known to be nullified, then it will not launch until its previous target register writer instruction retires, so that the local dependent instruction can indicate to the next instruction where to get its data, i.e., from the target rename register in the aqueue RRs 44a pertaining to a local instruction in the case of an unnullified local instruction or from the target register within the GRs 46 in the case of a nullified local instruction.

The mispredicted branch mechanism 112 advises the launch control logic 102 when a branch has been mispredicted so that recovery from the mispredicted branch can be accomplished. The mispredicted branch mechanism 112 determines which branch was predicted and examines the results of instruction execution to make a decision as to whether there has been a misprediction.

For example, consider the case of a branch instruction. If a branch is mispredicted, then the instructions speculatively fetched after the mispredicted branch, excepting the delay slot instruction, are purged, and the ifetch mechanism 29 and sort mechanism 32 are set up to insert new instructions into the aqueue 38a, starting just after the delay slot instruction associated with the mispredicted branch instruction. Then, the delay slot instruction and the subsequent new instructions are executed.

Furthermore, if the branch instruction is capable of nullifying its delay slot instruction, then there can be a misprediction associated with nullification of the delay slot instruction. If it is erroneously predicted that the delay slot instruction should be nullified, then upon determining the misprediction, the delay slot instruction, if it has already been executed, is valid and is utilized. If it is wrongly predicted that the delay slot instruction should not be nullified, then upon determining the misprediction, the delay slot instruction is invalidated and re-executed. Re-execution is necessary to change the state of a nullified flag bit (deasserted to asserted) associated with the result in the rename registers 44a. When this situation occurs, the delay slot instruction will be the last valid instruction in the queue 38a.

Figure 5:
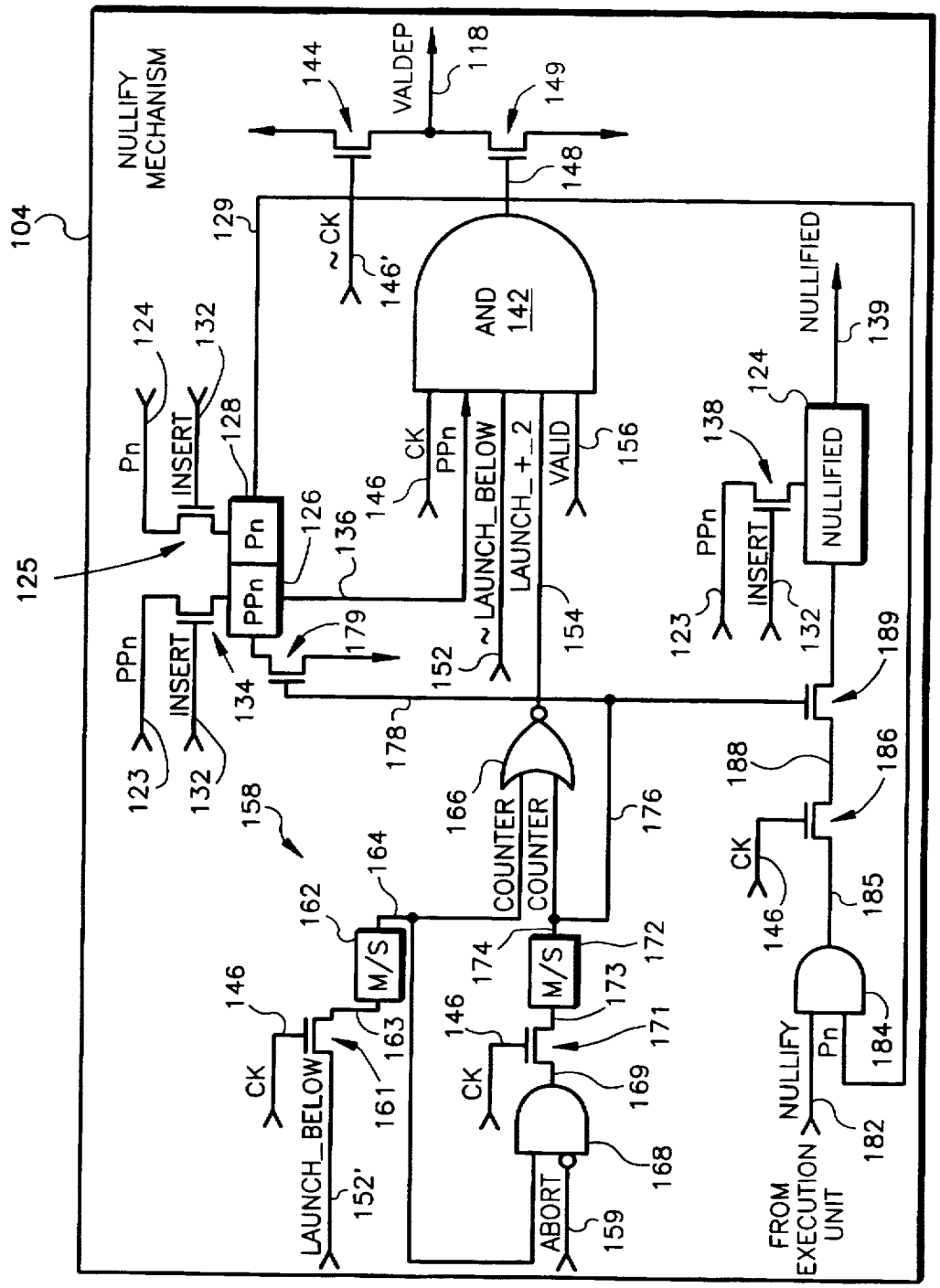
FIG. 5 is a electronic block diagram of a nullify mechanism of FIG. 4.

The nullify mechanism 104 (FIG. 4) is shown in further detail in FIG. 5. The nullify mechanism 104 maintains a nullified indicator 124, such as a latch or register, for indicating whether or not the local instruction has in fact been actually nullified by a previous instruction. The nullify mechanism 104 maintains a PPn indicator 126, such as a latch or register, for indicating whether it has been predicted that the local instruction is potentially nullified, and a Pn indicator 128, such as a latch or register, for indicating whether the local instruction has been identified as potentially nullified by the sort mechanism 32 based upon the N bit of the previous instruction. If the PPn indicator is asserted, then the local instruction will not be executed, until the nullifying instruction launches execution, because the valdep signal 118 will be asserted to the launch control logic 102 (FIG. 4). In the preferred embodiment, the valdep signal 118 is true, or asserted, when it exhibits a logic low ("0") and is false, or deasserted, when it exhibits a logic high ("1").

Initially, when an instruction is inserted into the aslot 39a, an insert signal 132 is generated by the aqueue 38a, and the insert signal 132 actuates (a) the transistor 134 to insert the PPn bit from the sort mechanism 32 into a PPn bit indicator 126, such as a register or latch, (b) the transistor 138 to insert the PPn bit into a nullified indicator 124, such as a register or latch, and (c) the transistor 125 to insert the Pn bit decoded from the opcode of the into a Pn indicator 128, such as a register or latch. The Pn and PPn bits and their states were established previously by the sort mechanism 32 (FIG. 2) and were associated with the inserted instruction.

With respect to launching of the local instruction, an AND logic gate 142 controls launching of the instruction by asserting and deasserting the valdep signal 118. The valdep signal 118 is initially precharged high, or deasserted, by a transistor 144 during the precharge phase of a not clock signal (~CK) 146'. The valdep signal 118 can be pulled low, or asserted, by the AND logic gate 142 via output 148 that actuates transistor 149. The AND logic gate 142 receives the clock signal CK 146, a PPn bit 136 from the PPn indicator 126, a not launch below signal (~launch_below) 152 from a previous aslot 39a to indicate whether or not the instruction of the previous aslot 39a has just launched, a cycle count signal (launch_+_2) 154 to indicate when two or fewer cycles have passed since the previous aslot 39a launched its instruction, and a valid signal 156 from the launch control logic 102 (FIG. 4) to indicate whether or not there is a valid local instruction in the aslot 39a. Based upon the foregoing signals, the AND logic gate 142 will generate the AND logic gate output 148. Essentially, the valdep signal 118 will be asserted by the AND logic gate 142 to prevent launch if all of the following are true: (a) the local instruction has been predicted as potentially nullified as defined by the PPn bit 126, (b) the previous instruction in the previous aslot 39a did not just launch, (c) the previous instruction has not launched exactly one or two cycles ago, and (d) the valid signal 156 indicates that the local instruction is valid.

The cycle counter employed by the nullify mechanism 104 is indicated at reference numeral 158. The cycle counter 158 receives the launch below signal 152 and a not abort (~ABORT) signal 159. The launch below signal 152' indicates when the previous instruction has been launched, and the not abort signal 159, which is received from the ALU 42', indicates whether or not the previous instruction was aborted. A launch may be aborted when one or more of its operands are determined to be invalid, such as when they are from a cache access that initially missed.

In the cycle counter 158, the launch below signal 152' is passed to a transistor 161, which is actuated by the clock 146. The output 163 of the transistor 161 is passed to a master/slave (M/S) latch 162, which generates a counter signal 164. The counter signal 164 is passed to a NOR (not OR) logic gate 166. The NOR logic gate 166 generates the cycle count signal 154 for the AND logic gate 142.

An AND logic gate 168 receives the not abort signal 159 and the counter signal 164 from the M/S latch 162 and generates an output 169 for a transistor 171, which is actuated by the clock 146. The transistor 171 is connected to a M/S latch 172 via connection 173. The M/S latch 172 generates a counter signal 174 that is passed to the NOR logic gate 166. Based upon the foregoing configuration as shown and described, the NOR logic gate 166 will assert the cycle count signal 154 one and two cycles after the launch below signal 152' has been asserted, provided that an abort signal 159 has not been received by the nullify mechanism 104.

When the counter signal 174 is asserted two cycles after the launch below signal 152' has been asserted, the nullified indicator 124 is updated to its final value based upon the result of the nullifying instruction. The nullified bit is initially set on insertion of the local instruction to the value of the PPn bit. This is how the nullify prediction affects the behavior of the predicted instruction's tfield.

The aforementioned nullified indicator update is accomplished by actuation of transistor 189 via assertion of line 174, line 176, and line 178. The nullified indicator 124 can be set to assert the nullified signal 139 based upon a nullify signal 182 from the execution unit 42 (FIG. 2). In turn, the state of the nullify signal 182 is based upon execution of the previous instruction and the Pn bit 129, provided that the analysis is performed during the second cycle after the previous instruction launch. In this regard, an AND logic gate 184 receives the nullify signal 182 and the Pn bit 129 and generates an output 185 that is passed to a transistor 186. The transistor 186 is actuated by the clock 146 and produces a signal 188 for the transistor 189 that is connected to the nullified indicator 124 and actuated by the line 139.

In operation, the nullify mechanism 104 identifies whether or not the local instruction has been predicted as potentially nullified based upon the PPn bit. If it is predicted as not potentially nullified, i.e., the PPn bit is deasserted, then the nullify mechanism 104 will not assert the valdep signal 118 and will permit the local instruction to launch and execute. However, it is still possible that the local instruction will be nullified, if both (a) the Pn bit is asserted to indicate that the local instruction is dependent upon a remote nullifying instruction and (b) the remote nullifying instruction causes generation of the nullify signal 182 from the execution unit 42 at two cycles after launch of the nullifying instruction.

If the local instruction is predicted as potentially nullified, i.e., the PPn bit is asserted, then the nullify mechanism 104 prevents a launch of the local instruction until the dependency is cleared by the nullifying instruction that established the dependency. In other words, the local dependent instruction is prevented from launching until the remote nullifying instruction is launched. The remote nullifying instruction clears the dependency by forcing the PPn bit 136 is low with transistor 179 during the second cycle after launch of the previous instruction. If the nullify signal 182 is deasserted, then the nullified indicator 124 is reset so that the nullified signal 139 is deasserted. In contrast, if the nullify signal 182 is asserted, then the nullified indicator 124 remains set so that the nullified signal 139 is asserted. Moreover, when the PPn bit 136 goes low as a result of the launch of the remote nullifying instruction, then the AND logic gate 142 is prevented from asserting the valdep signal 118.

Figure 6:
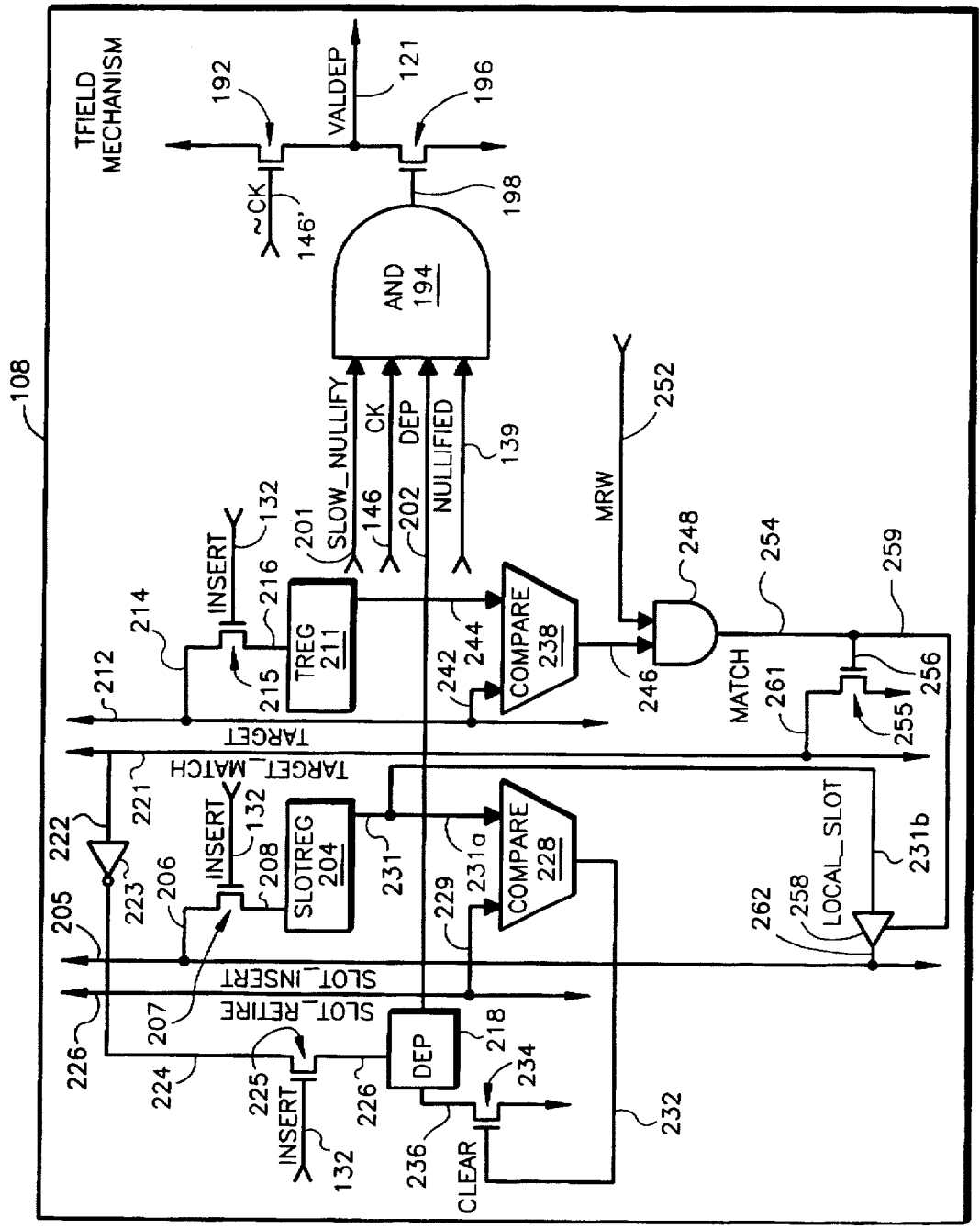
FIG. 6 is a electronic block diagram of a tfield mechanism of FIG. 4.

The tfield mechanism 108 (FIG. 4) is shown in further detail in FIG. 6. The tfield mechanism 108 asserts or deasserts the valdep signal 121 to the launch control logic 102 (FIG. 4) to control launching of the local instruction. The tfield mechanism 108 prevents a launch by asserting the valdep signal 121 when both the local instruction is dependent upon a previous instruction and the previous instruction has not yet retired. As mentioned, if the local instruction is dependent (potentially nullified or known to be nullified), then the local dependent instruction should not launch until its previous target writing instruction retires, so that the local dependent instruction can indicate to the next dependent instruction where to get its data, i.e., from the target rename register in the aqueue RRs 44a pertaining to a local instruction in the case of an unnullified local instruction or from the target register within the GRs 46 in the case of a nullified local instruction.

Generally, the tfield mechanism 108 is designed to assert the valdep signal 121 until the tfield mechanism 108 determines either (a) that the local instruction is not nullified or (b) that the previous instruction that has written to the target register has retired, i.e., the dependency has been removed.

The valdep signal 121 is precharged to a high logic state, or deasserted, when the clock ~CK 146 is asserted via transistor 192. The valdep signal 121 is pulled low, or asserted, when an AND logic gate 194 actuates a transistor 196 with an asserted output 198. The AND logic gate 194 effectively controls the assertion or deassertion of the valdep signal 121. The AND logic gate 194 will deassert the valdep signal 121 if any one of the following inputs is deasserted and will assert the valdep signal 121 if all of the following inputs are asserted: the clock signal CK 146, a slow nullify signal (SLOW__NULLIFY) 201, a dependency signal 202, or the nullified signal 139.

The slow nullify signal 201 is asserted or deasserted based upon whether or not the fast nullify system 50 is employed. When the fast nullify system 50 is employed, the tfield dependency is effectively ignored. Said another way, in this case, the tfield mechanism 108 cannot prevent launching of the local instruction, despite the fact that the local instruction may be potentially nullified. As described previously, with the fast nullify system 50, the result of the local instruction is selected as either the current result of the local instruction or the previous result that was written to the target register by a previous instruction. Further, the fast nullify system 50 can be employed in connection with an instruction that provokes an integer operation when the instruction will cause the execution unit 42 to read less operands than what the execution unit 42 is capable of reading.

The dependency signal 202 is asserted or deasserted based upon whether or not the local instruction has the same target register as a remote instruction. The target register stores the results of the instruction.

The nullified signal 139 is asserted or deasserted by the nullify mechanism 104 (FIG. 5) based upon whether or not the previous instruction has in fact nullified the local dependent instruction or is predicted to do so.

When the local instruction is inserted into the aslot 39a, a slot register (slotreg) 204 receives a slot identification (e.g., a slot number) that is broadcast on the slot insert connection (slot__insert) 205 and passed to the slot register 204 via connection 206, transistor 207, and connection 208. Also upon insert, a local target register (treg) 211 receives a target register identification that is broadcast on target connection 212 via a connection 214, transistor 215, and connection 216. The target register identification is essentially an address corresponding with the target register within the RRs 44a or the GRs 46 where the results from instruction execution are stored.

Also upon insert of the local instruction, a dependency indicator 218, such as a register, latch, or other suitable bit storage mechanism, is set to assert or deassert the dependency signal 202, based upon whether or not the local instruction has the same target register identification as a remote instruction in a remote aslot 39a. The dependency indicator 218 is asserted and deasserted by a target match signal 221, which is pulled low by a remote tfield mechanism 108 to indicate to the local instruction when there is another instruction currently in the aqueue 38a that writes the same target register 44a. The target match signal 221 actuates the dependency indicator 218 via connection 222, inverter 223, connection 224, transistor 225, and connection 226.

When the previous target register writing instruction retires, it broadcasts its slot identification on the slot retire connection (slot_retire) 226. The slot identification is passed to a slot compare mechanism 228 via connection 229. The slot compare mechanism 228 compares the slot identification of the retired previous target writing instruction with the local slot identification from the slot register 204 in order to assert or deassert a clear signal 232. The clear signal 232 is used to actuate a transistor 234, which causes the dependency indicator 218 to deassert the dependency signal 202. Deassertion of the dependency signal 202 causes the valdep signal 121 to be deasserted. Hence, when a nullifying instruction is retired, the dependency is removed and the local dependent instruction is permitted to launch and execute.

The tfield mechanism 108 is also equipped with a mechanism to inform a remote dependent instruction when the local tfield mechanism 108 is associated with a local previous instruction that writes the same target register. In this regard, the tfield mechanism 108 includes a target compare mechanism 238, which receives a target identification from target connection 212 via connection 242 and which receives a local target identification from the local treg 211 via connection 244. The dependent instruction places its target identification on the target connection 212 when it is inserted into a remote aslot 39a. Moreover, the target compare mechanism 238 asserts or deasserts its output 246 based upon whether or not there is a match between the target register identifications of the remote instruction and local instruction.

The output 246 is passed to an AND logic gate 248 along with a most recent writer (MRW) signal 252. The MRW signal 252 is asserted or deasserted to indicate whether or not the local nullifying instruction is the most recent writer to the target register in the GRs 46 (FIG. 2). If it is, then it responds by driving its slot number upon slot_insert 205. If not, then it does not drive its slot number, and another slot holding the instruction with the MRW set will drive its slot number. The MRW signal can be generated with any suitable analysis logic, which can be generated by one with skill in the art. Essentially, the MRW signal 252 is generated by logic that keeps track of the youngest instruction currently in the aqueue 38a that will write each active target register.

The AND logic gate 248 generates a match signal 254, which is passed to a transistor 255 via connection 256 and to a driver 258 via connection 259. The transistor 255, when actuated, asserts the target match signal 221 by pulling it low so that the remote tfield mechanism 108 associated with the dependent instruction will set its corresponding dependency indicator 218 to assert its respective dependency signal 202. Furthermore, assertion of the match signal 254 from AND logic gate 248 causes the driver 258 to drive the local slot identification (local_slot) 231b from slot register 204 to the slot insert connection 205 via connection 262. Hence, the previous writer instruction's slot identification is forwarded to the dependent instruction's tfield mechanism 108. The remote dependent instruction's tfield mechanism 108 will monitor the local instruction, and when the local instruction retires, then the dependency will be removed.

The architecture of the mqueue 38b will now be addressed. Structurally, each of the mslots 39b includes the components set forth in FIGS. 4 through 6, with several exceptions that are described hereafter. Accordingly, aside from these exceptions, the discussion previously in regard to the aslots 39a is incorporated herein by reference and applied to the mslots 39b.

The mqueue 38b of FIG. 2 does not contain any nullifying instructions, but may contain dependent instructions. Further, these dependent instructions in the mqueue 38b are advised by their corresponding nullifying instructions in the aqueue 38a (particularly, the execution unit 42 that processes the nullifying instruction) when they are nullified. For these reasons, the mslots 39b of the mqueue 38b do not include any apparatus for determining whether an instruction is a nullifying instruction.

Upon insertion of an instruction into the mqueue 38b, the memory instruction is advised as to which arithmetic instruction can potentially nullify it by the slot correspondence logic 35 (FIG. 2). In the preferred embodiment, the slot correspondence logic 35 essentially provides the slot number of an arithmetic nullifying instruction to the appropriate mslot 39b that contains the potentially nullified instruction. When the nullifying instruction launches, the mslot 39b recognizes this by matching the launch slot number with its known nullify slot number. Further, when a nullifying instruction in the aqueue 38a is to nullify a memory instruction, the nullify signal 182 (FIG. 5) associated with the nullify mechanism 104 in the mslot 39b of the dependent memory instruction will assert the nullify signal to the memory instruction's nullify mechanism 104 so that the memory instruction is nullified.

Many variations and modifications may be made to the preferred embodiment of the invention as described previously. As an example, instructions in the preferred embodiment were reordered in queues 38a, 38b; however, one with skill in the art would realize that instructions can be reordered in any suitable reordering mechanism, including a reservation station. As another example, the fast nullify system 50 and associated methodology may be employed in connection with floating point operations involving two or less operands. In this variant embodiment, the MACs 42" are designed to read the floating point operand, if any, and the previous result from the result register within the GRs 46 or the RRs 44a. The appropriate MAC 42" then selects as its results either the previous floating point value of the result register or the current operation's floating point result based upon whether the instruction gets nullified or not. All such modifications and variations are intended to be included herein within the scope of the present invention, as is defined by the following claims.

Finally, in the claims hereafter, the structures, materials, acts, and equivalents of all means-plus-function elements and all step-plus-function elements are intended to include any and all structures, materials, or acts for performing the specified functions.

Wherefore, the following is claimed:

1. A method for implementing a fast nullify procedure for facilitating handling of nullification dependencies in a processor that executes instructions out of order, comprising the steps of:

(a) identifying a nullifying instruction and a dependent instruction that can potentially be nullified by said nullifying instruction;

(b) determining whether said dependent instruction qualifies for said fast nullify procedure in that said dependent instruction requires less operands, if any, than a number than can be read by an execution unit;

(c) allowing said dependent instruction to execute during execution of said nullifying instruction;

(d) when said dependent instruction qualifies for said fast nullify procedure:

(1) executing said dependent instruction without waiting for a target architecture register to be updated with a previous result;

(2) during execution of said dependent instruction, reading with said execution unit said previous result of said target architecture register along with said operands, if any;

(3) storing a current result of said dependent instruction in a target rename register when said dependent instruction is not nullified by said nullifying instruction; and (4) storing said previous result in said target rename register when said dependent instruction is nullified by said nullifying instruction;

(5) transferring either said current result or said previous result, whichever resides in said target rename register, from said target rename register to said target architecture register; and (e) when said dependent instruction does not qualify for said fast nullify procedure;

(1) executing said dependent instruction after said target architecture register is updated with said previous result;

(2) during execution of said dependent instruction, reading said operands with said execution unit, one of which is instead of said previous result;

(3) storing said current result of said dependent instruction in said target rename register;

(4) transferring said current result from said target rename register to said target architecture register when said dependent instruction is not nullified by said nullifying instruction; and (5) refraining from transferring said current result of said dependent instruction in said target rename register to said target architecture register when said dependent instruction is nullified by said nullifying instruction.

2. The method of claim 1, wherein said dependent instruction immediately follows said nullifying instruction in program order.

3. The method of claim 1, wherein said nullifying instruction is a branch instruction and said dependent instruction immediately follows said branch instruction.

4. The method of claim 1, further comprising the step of performing an integer operation with said dependent instruction.

5. The method of claim 1, further comprising the step of performing a floating point operation with said dependent instruction.

6. The method of claim 1, further comprising the steps of:

distributing arithmetic and memory instructions into respective arithmetic and memory queues; and executing said nullifying instruction from said arithmetic queue.

7. A system for implementing a fast nullify procedure for facilitating handling of nullification dependencies in a processor that executes instructions out of order, comprising:

(a) an execution unit configured to execute instructions;

(b) a fetch mechanism associated with said processor for fetching said instructions;

(c) a reordering mechanism associated with said processor, said reordering mechanism for communicating said instructions in an out of order sequence to said execution unit, said reordering mechanism comprising:

(1) means for identifying a nullifying instruction and a dependent instruction that can potentially be nullified by said nullifying instruction;

(2) means for determining whether said dependent instruction qualifies for said fast nullify procedure in that said dependent instruction requires less operands, if any, than a number that can be read by an execution unit;

(3) means for allowing said dependent instruction to execute during execution of said nullifying instruction;

(4) means, responsive when said dependent instruction qualifies for said fast nullify procedure, comprising:

(i) means for executing said dependent instruction without waiting for a target architecture register to be updated with a previous result;

(ii) means for during execution of said dependent instruction, reading with said execution unit said previous result of said target architecture register 'with said operands, if any;

(iii) means for storing a current result of said dependent instruction in a target rename register when said dependent instruction is not nullified by said nullifying instruction; and (iv) means for storing said previous result in said target rename register when said dependent instruction is nullified by said nullifying instruction;

(v) means for transferring either said current result or said previous result, whichever resides in said target rename register, from said target rename register to said target architecture register; and (5) means responsive when said dependent instruction does not qualify for said fast nullify procedure, comprising:

(i) means for executing said dependent instruction after said target architecture register is updated with said previous result;

(ii) means for during execution of said dependent instruction, reading said operands with said execution unit, one of which is instead of said previous result;

(iii) means for storing said current result of said dependent instruction in said target rename register;

(iv) means for transferring said current result from said target rename register to said target architecture register when said dependent instruction is not nullified said nullifying instruction; and (v) means for refraining from transferring said current result of said dependent instruction in said target rename register to said target architecture register when said dependent instruction is nullified by said nullifying instruction.

8. The system of claim 7, wherein said dependent instruction immediately follows said nullifying instruction in program order.

9. The system of claim 7, wherein said nullifying instruction is a branch instruction and said dependent instruction immediately follows said branch instruction.

10. The system of claim 7, wherein said dependent instruction defines an integer operation.

11. The system of claim 7, wherein said dependent instruction defines a floating point operation.

12. The system of claim 7, further comprising:

arithmetic and memory queues associated with said reordering mechanism;

a sort mechanism configured to identify arithmetic and memory instructions that are fetched, said sort mechanism configured to distribute said arithmetic and memory instructions into said arithmetic and memory queues, respectively; and wherein said nullifying instruction is placed in and executed from said arithmetic queue.

* * * * *